United States Patent [19]

Hoagland et al.

[11] Patent Number: 5,145,208
[45] Date of Patent: Sep. 8, 1992

[54] AIR BAG DEVICE FOR VEHICLES

[75] Inventors: Larry D. Hoagland; Stephen J. Brockman, both of Noblesville, Ind.

[73] Assignee: Ideatech, Inc., Fishers, Ind.

[21] Appl. No.: 650,679

[22] Filed: Feb. 5, 1991

[51] Int. Cl.⁵ ............................................. B60R 21/16
[52] U.S. Cl. ................................. 280/734; 280/737; 180/274
[58] Field of Search ............ 280/737, 736, 735, 734, 280/741, 728; 180/271, 274

[56] References Cited

U.S. PATENT DOCUMENTS

| | | | |
|---|---|---|---|
| 3,815,703 | 6/1974 | De Lorean et al. | 280/734 |
| 3,862,669 | 1/1975 | Lindbert et al. | 280/734 |
| 3,883,156 | 5/1975 | Frazier | 280/737 |
| 3,922,002 | 11/1975 | Lindbert et al. | 280/734 |
| 3,966,226 | 6/1976 | Roth | 280/737 |
| 3,982,774 | 9/1976 | Ivashuk et al. | 280/737 |
| 4,050,483 | 9/1977 | Bishop | 280/737 |
| 4,172,603 | 10/1979 | St. Clair et al. | 280/734 |
| 4,215,878 | 8/1980 | Hirbod | 280/737 |
| 4,699,400 | 10/1987 | Adams et al. | 280/731 |

*Primary Examiner*—Karin L. Tyson
*Attorney, Agent, or Firm*—Jack Schuman

[57] ABSTRACT

A safety device is described for use with a vehicle. The device incorporates mechanical cutting means which, in response to a collision, positively cut a seal that fluidally separates a source of pressurized fluid from an air bag. Sensing means are also included which detect a collision and cause the mechanical cutting means to actuate, thus inflating the air bag and protecting occupants of the vehicle. Also described is a manifold which fluidally couples a plurality of sensing means to a plurality of air bags. Upon one or more sensing means detecting a collision, the manifold actuates one or more air bags.

6 Claims, 8 Drawing Sheets

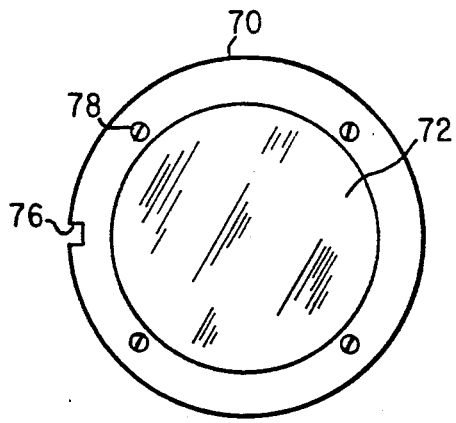
Fig.5
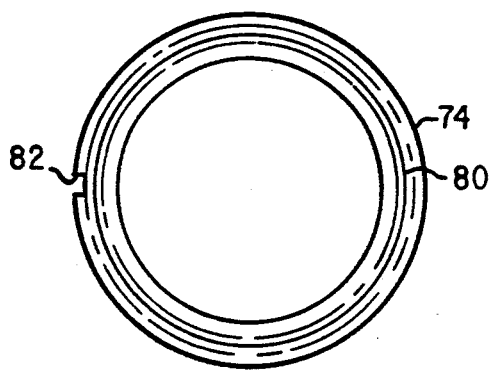 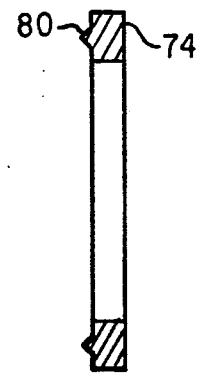
Fig.6      Fig.7
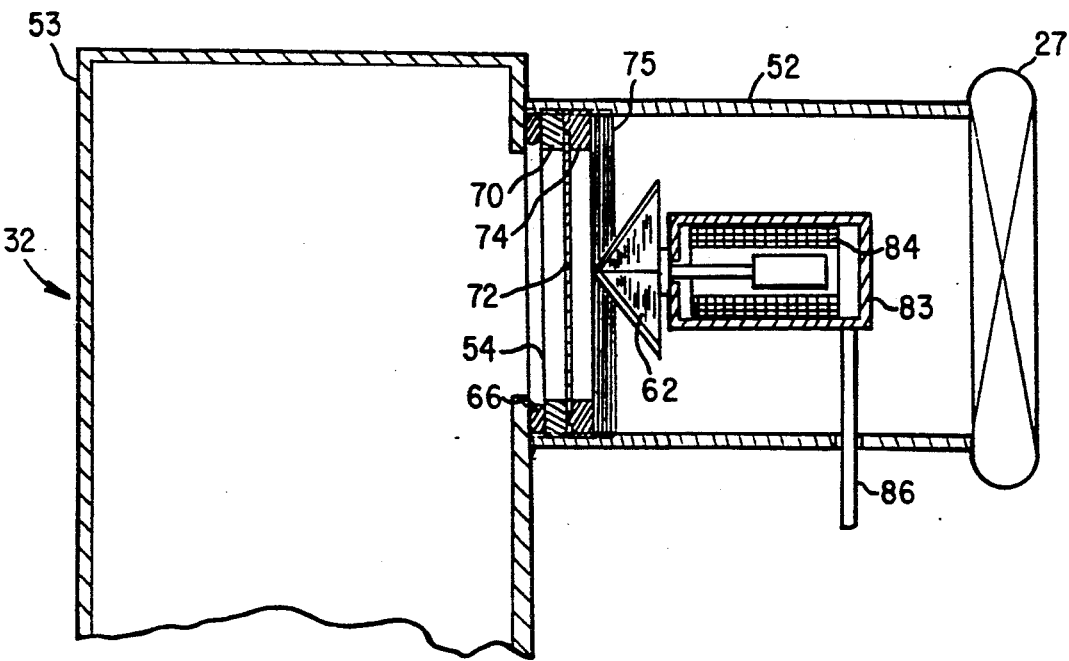
Fig.8

AIR BAG DEVICE FOR VEHICLES

BACKGROUND OF THE INVENTION

The present invention relates in general to a safety device and more specifically to a safety device for use with a vehicle.

With the advent of increasingly faster modes of transportation, vehicle manufacturers have increased the amount of protection afforded by a vehicle, both in the number of safety devices and in the sophistication of each safety device. To further encourage vehicle manufacturers to incorporate safety features in their products, the federal government has often promoted safety legislation which mandate varying degrees of safety for vehicles, including automobiles. Among other such mandates as crash resistant bumpers on autombiles and seat belts for passengers in automobiles, current federal legislation has focused on the incorporation of passive restraint devices in automobiles, one such restraint device being an air bag.

Air bags, as passive restraint devices for automobiles, are inflatable during an automobile accident by a source of pressurized fluid. These devices have generally fallen into two categories; inflation from those expansion processes employing reactive or explosive means for inflating, and inflation from expansion processes involving the liberation of pre-pressurized gasses contained within a pressure vessel.

Air bag devices have been developed which pertain to the latter liberation of gasses. Two such devices by Okada, U.S. Pat. No. 4,203,616 and U.S. Pat. No. 4,289,327, appear to disclose an air bag mechanism with a pre-pressurized canister separated from the air bag by a frangible member. The frangible member is dependent on a pressing lid for support. Upon impact of a vehicle, a mechanism causes the pressing lid to move, thereby allowing pressure within the canister to rupture the frangible member. Another device by Hirbod, U.S. Pat. No. 4,215,878, appears to disclose a bumper-air bag system having three valve mechanisms connected to a vehicle bumper. Movement of the bumper during a collision appears to build up pressure to a level which ruptures a diaphragm and liberates pre-pressurized gasses.

Weman, U.S. Pat. No. 3,927,901, appears to disclose a vehicle air bag system with several air bags all interconnected to a pressurized air tank. Impact causes the generation of a pressure wave within the tank which propagates throughout the tank towards the valves and causes the valves to open, thus inflating an air bag. Hodges, U.S. Pat. No. 2,755,125, Sandor, U.S. Pat. No. 2,931,665, and Lee et al., U.S. Pat. No. 4,258,931, all appear to disclose other air bag devices which inflate an air bag using pre-pressurized air stored in a container.

The above described devices rely on either pressure differential to rupture a seal or pressure-activated valves to release pre-pressurized air stored in a pressure vessel. Because both pressure-ruptureable seals and pressure-activated valves do not positively release air from a storage container, a need exists for an improved safety device for use with a vehicle that employs a positive release mechanism to release a source of pressurized fluid and inflate an air bag.

SUMMARY OF THE INVENTION

A safety device for use with a vehicle is disclosed. The safety device incorporates an inflatable air bag coupled to a source of pressurized fluid. A frangible seal fluidally separates the source of pressurized fluid from the inflatable air bag until a collision occurs. Upon a collision occurring, sensing means for sensing a collision causes mechanical cutting means to positively cut the frangible seal, thereby allowing fluid to flow from the source to the air bag and inflate the air bag.

Also disclosed is a common manifold in conjunction with a plurality of safety devices; the safety devices including a plurality of sensing means, air bags, sources, seals and mechanical cutting means. The manifold is fluidally coupled to a plurality of sensing means through a corresponding plurality of one-way check valves. The manifold is also fluidally coupled to a plurality of mechanical cutting means. Upon one or more sensing means sensing a collision, the manifold receives fluid communication from the sensing means through the check valves. The manifold then transmits fluid communication to one or more mechanical cutting means, thus causing the mechanical cutting means to cut the seals and allow fluids to flow from the sources to the air bags and inflate the air bags.

One object of the present invention is to provide an improved safety device.

Another object of the present invention is to provide an improved safety device for use with a vehicle.

Still another object of the present invention is to provide an improved safety device for use with a vehicle that employs a positive release mechanism to release a source of pressurized fluid and inflate an air bag.

These and other objects, features and advantages of the present invention will become more apparent from the following written description of the preferred embodiments and accompanying figures.

BRIEF DESCRIPTION OF THE DRAWINGS

FIG. 5 is a front elevational view of a membrane fastened to a mounting ring.

FIG. 6 is a front elevational view of a sealing ring.

FIG. 7 is a side elevational view of a sealing ring.

FIG. 8 is a side partial cross-sectional view of an alternate embodiment of the present invention with a mechanical cutter incorporating a solenoid.

DESCRIPTION OF THE PREFERRED EMBODIMENT

Figure 1:
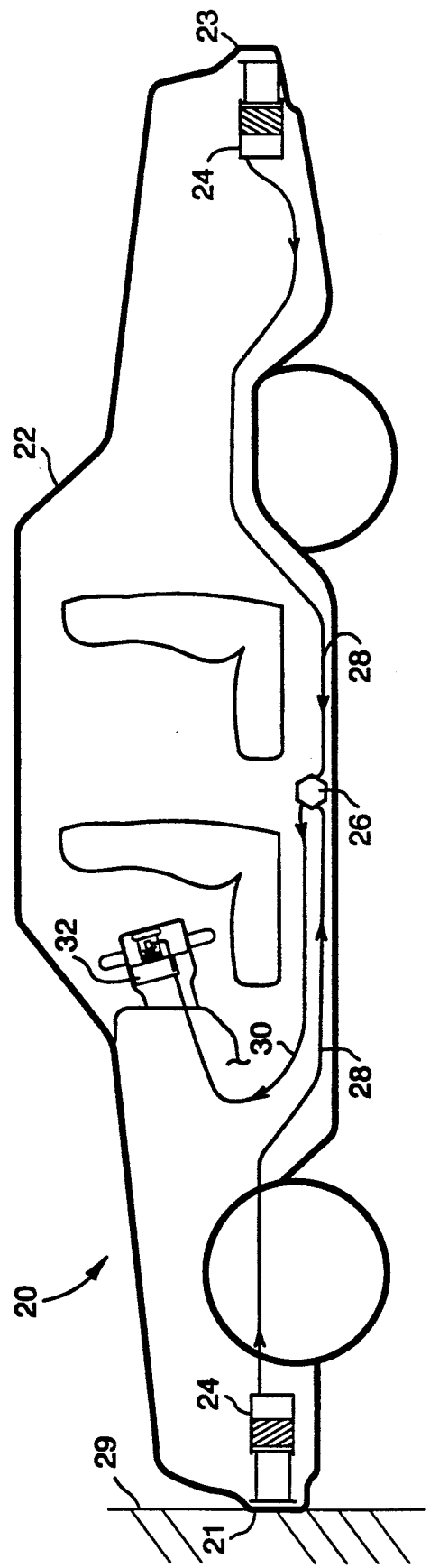
FIG. 1 is a side cut-away view of an embodiment of the present invention installed in an automobile.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

An air bag device 20 is shown installed in vehicle 22. Device 20 comprises generally sensing means such as sensor 24 for sensing a collision, a central manifold 26 and an air bag unit 32. Device 20 can be installed in a variety of vehicles, including automobiles. Other road going vehicles are also envisioned, including mass transit vehicles available to the public such as school buses and buses in general. Similarly, other mass transit vehicles contemplated by this invention are subway cars and trains. Also envisioned are installations in vehicles which are not road or rail going, but still provide transport. These vehicles include both ships and planes. The essential point of the invention being that device 20 is adaptable to any vehicle where protection of the vehicle's contents, including human passengers, is desired.

As shown in FIG. 1, sensors 24 are connected to manifold 26 via receiving lines 28. Manifold 26 in turn is connected to air bag unit 32 via transmitting line 30. Sensors 24 are attached to vehicle 22 at locations commonly contacted during a collision. These locations primarily include the front and rear bumpers of vehicle 22, bumpers 21 and 23 respectively. Of course, sensors 24 can be mounted elsewhere on vehicle 22, but sensors 24 are best employed where contact is likely during a collision. Sensors 24 can be contained within front and rear bumpers 21 and 23 respectively, or can extend through or protrude from the front and rear bumpers. If sensors 24 are contained within the bumpers, the bumpers will deform upon a collision to substantially contact one or more sensors 24, thereby actuating air bag unit 32. Similarly, if sensors 24 protrude from bumpers 21 and 23, substantial contact during a collision will cause one or more sensors 24 to actuate air bag unit 32.

Figure 2:
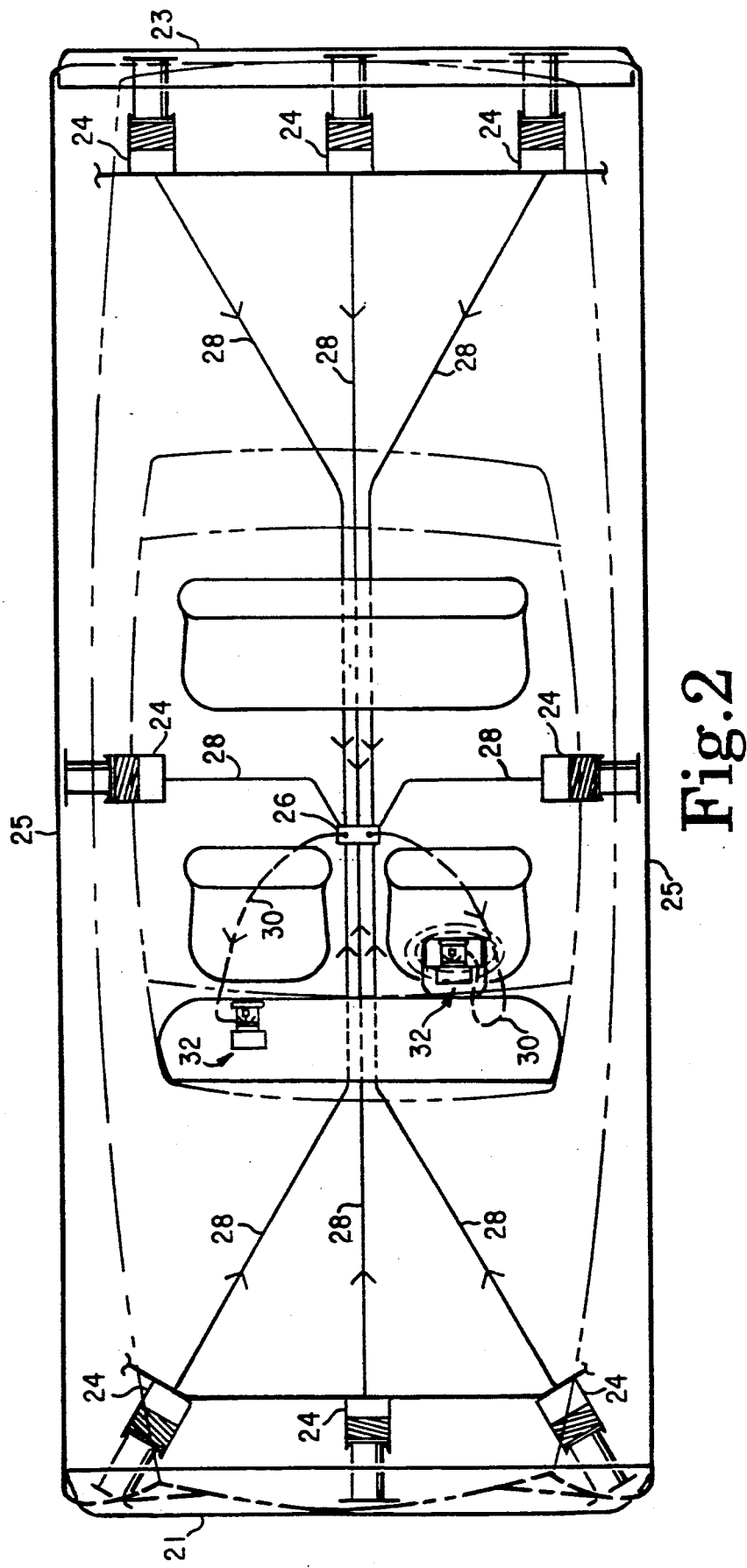
FIG. 2 is a top view of sensors oriented fore and aft and transverse in an automobile.

Furthermore, sensors 24 need not be oriented fore and aft as depicted, but can also be displayed at various angles and orientations as shown in FIG. 2. FIG. 2 depicts sensors 24 mounted normal to bumpers 21 and 23 and at angled corners of bumper 21. Of course, a variety of orientations and quantities of sensors can be employed along the bumpers, the essential requirement being that sensors 24 detect impacts involving bumpers 21 and 23.

Similarly, as previously discussed sensors 24 are not limited to locations along front and rear bumpers 21 and 23, but can include other transverse locations such as sides 25 of vehicle 22. These side locations can include varying heights as well, such as locations beneath a door, within a door pillar, or in a roof pillar of vehicle 22. Sensors 24 can also be oriented vertically along top surfaces of vehicle 22, including front and rear decks and roof. Thus, sensors 24 can be oriented to detect a wide range of collisions involving vehicle 22, including head-on collisions, rear-end collisions, side collisions and roll-over of vehicle 22.

Other sensing means which can detect a collision involving vehicle 22 are also contemplated. These means include but are not limited to, motion detectors such as inertial switches and accelerometers. Also, sensors 24 need not be located on vehicle 22. For example, vehicle 22 can incorporate receivers which receive airwave signals from sensors of another vehicle, thereby allowing other vehicles or barriers to trigger air bag unit 32 of vehicle 22.

Referring back to FIG. 1, sensors 24 transmit fluid communication through line 28 to manifold 26. Manifold 26 relays this communication by transmitting a like fluid communication through line 30 to air bag unit 32. Of course, air bag unit 32 can also communicate directly with sensor 24 as well. However, the addition of manifold 26 allows one or more sensors to trigger one or more air bags.

Figure 1A:
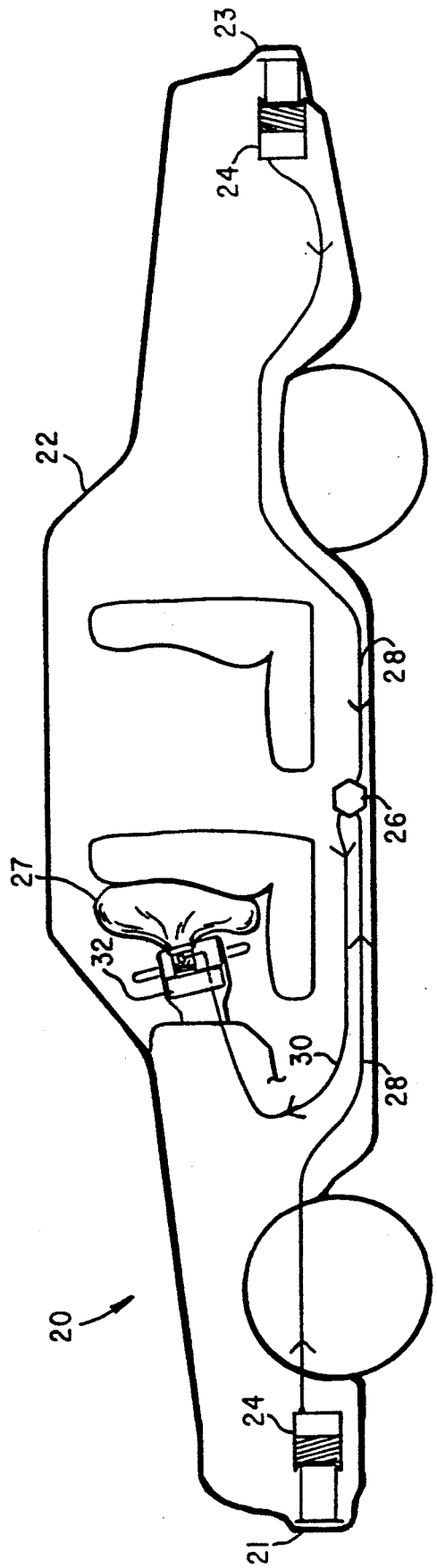
FIG. 1a is a side cut-away view of an embodiment of the present invention installed in an automobile with an air bag actuated.

Air bag unit 32 is responsive to communication from sensor 24 via manifold 26 and upon such communication activates an air bag 27 as shown in FIG. 1a. Air bag 27 is shown inflated in response to sensor 24 of vehicle 22 detecting a collision with a barrier 29. Upon inflating, air bag 27 both restrains and cushions occupants from impact resulting from a collision. As illustrated, air bag unit 32 is installed in a steering column of vehicle 22. This invention also contemplates other installation locations within vehicle 22. These locations include, but are not limited to, door panels, headliners, dashboards, passenger seats, etc., where the essential function of air bag 27 upon inflation is to protect occupants of vehicle 22. "L"-shaped air bags which wrap around interior corners of the vehicle may be used.

Figure 3:
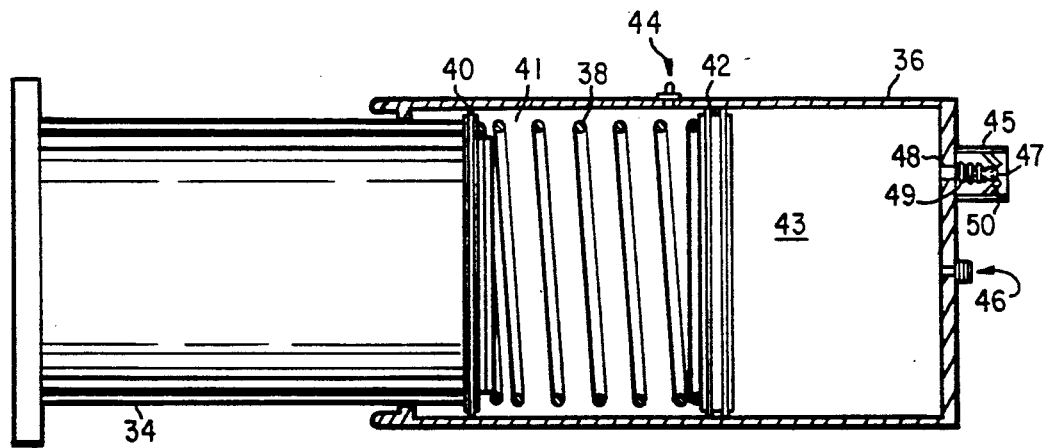
FIG. 3 is a side partial cross-sectional view of a sensor with its piston in a fully extended initial position.
Figure 3A:
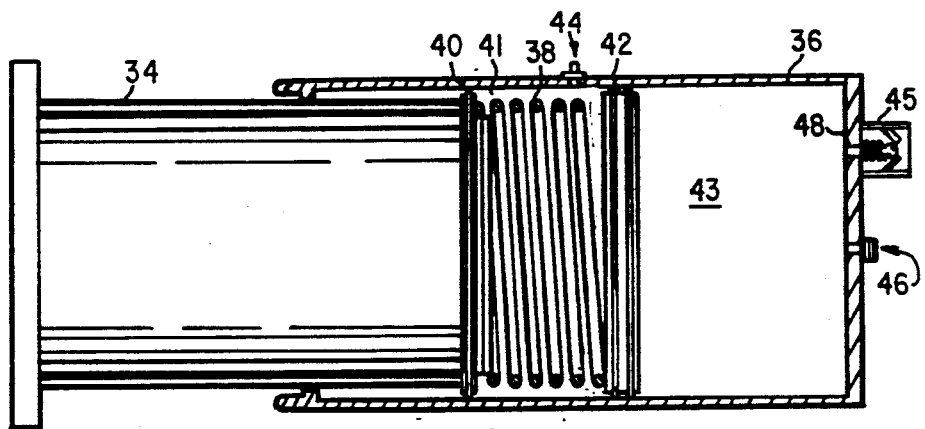
FIG. 3a is a side partial cross-sectional view of a sensor with its piston in a partially extended damping position.
Figure 3B:
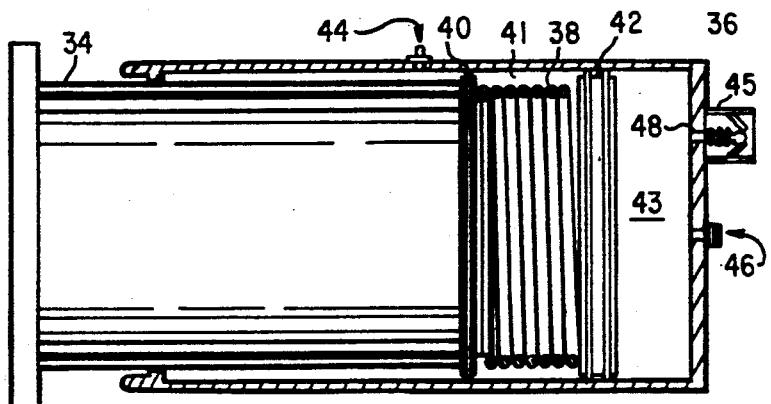
FIG. 3b is a side partial cross-sectional view of a sensor with its piston in a retracted actuating position.

Referring now to FIG. 3, FIG. 3a and FIG. 3b, sensor 24 and its operation are shown in detail. Sensor 24 comprises a fluid cylinder 36 and a piston 34 movable within cylinder 36. Piston 34 has connected to it a spring 38. Piston 34 and spring 38 can be sized to have an outer diameter closely corresponding to the inner diameter or bore of cylinder 36, thereby effectively providing a translatable sealing surface. However, to provide a more positive sealing mechanism, sensor 24 incorporates diaphragms 40 and 42. These diaphragms provide dynamic sealing surfaces having low friction characteristics for translating within cylinder 36, while still effectively sealing piston 34 within cylinder 36. Diaphragms 40 and 42 define a venting chamber 41 and a pressurizing chamber 43 within cylinder 36. Although not drawn, optional stops may be provided in the cylinder just immediately to the left of diaphragm 42 to restrict movement towards diaphragm 40 when chamber 43 is pressurized.

Also shown in FIG. 3 are orifices which allow fluid communication with cylinder 36. These orifices comprise a bleed orifice 44, a precharge orifice 48 and an actuating orifice 46. The function of these orifices will become apparent upon comprehension of the operation of sensor 24. As shown in FIG. 3, piston 34 is at a fully extended or initial position. This position is one normally occurring when no contact is made with piston 34. In this position bleed orifice 44 maintains an equilibrium between venting chamber 41 and outside atmospheric pressure by communicating fluid across orifice 44.

Similarly, precharge orifice 48 maintains an equilibrium between pressurizing chamber 43 and a regulating pressure source by allowing fluid to flow from the regulated pressure source into pressurizing chamber 43. However, fluid communication can only occur from the regulated pressure source to pressurizing chamber 43 because of a one-way check valve 45 incorporated at precharge orifice 48. Check valve 45 comprises a ball 47 and a spring 49 which traps the ball against seat 50. This arrangement allows fluid at a pressure sufficient to overcome spring 49 to enter chamber 43. Pressure within chamber 43 will tend to drive ball 47 against seat 50 to prevent fluid in chamber 43 from communicating out through check valve 45.

With sensor 24 at this initial position, pressure within cylinder 36 is that of the regulated pressure source. This pressure is also communicated to air bag unit 32 via actuating orifice 46. However, the regulated pressure is controlled so as not to activate air bag unit 32, but instead to provide a threshold of pressure that contact with piston 34 must overcome in order to activate air bag unit 32.

Referring now to FIG. 3a, sensor 24 is depicted with piston 34 in a partially extended or damping position. This position occurs when incidental contact is made with vehicle 22, the incidental contact insufficient to cause piston 34 to generate the pressure necessary to overcome the threshold pressure required to actuate air bag unit 32. Sensor 24, therefore, can be set to absorb varying levels of incidental contact by adjusting the regulated pressure source which in turn adjusts the pressure within cylinder 36. Sensor 24 is set so that contact resulting from a collision below two to three mile per hour does not actuate air bag unit 32. This set point allows for contact which meets the federal government mandate governing minimum contacts that bumpers 21 and 23 of vehicle 22 must absorb without incurring damage.

Upon incidental contact made with vehicle 22, piston 34 moves within cylinder 36. This movement and associated energy is absorbed by spring 38 and resisted by the pressure within chamber 43. Bleed orifice 44 communicates fluid during incidental contact to prevent movement of piston 34 from pressurizing vent chamber 41. After the incidental contact, piston 34 returns to its normally occurring position as depicted in FIG. 3 without incurring any damage.

Referring now to FIG. 3b, substantial contact made with vehicle 22, such as that resulting from a collision, causes piston 34 to translate within cylinder 36 and define an actuating position. In this actuating position, piston 34 is retracted within cylinder 36 and spring 38 is compressed. Also, fluid within pressuring chamber 43 is compressed so that a sufficient pressure exists within cylinder 36 to actuate air bag unit 32. As previously discussed, elevated pressures within chamber 43 do not result in fluid communication through precharge orifice 48 because of operation of check valve 45. Instead, fluid within cylinder 36 communicates through actuating orifice 46 to actuate air bag unit 32.

Variations on sensor 24 are also contemplated which employ a piston, a spring and a cylinder, keeping in mind that the essential function of sensor 24 is to absorb energy resulting from incidental contact through an energy absorbing medium, such as a spring, while still providing actuation of air bag unit 32 upon receiving substantial contact. For example, spring 38 can be connected to piston 34 so that spring 38 is external to cylinder 36 while still absorbing incidental contact. With spring 38 external to cylinder 36, no bleed orifice is required as there is no venting chamber.

Figure 4:
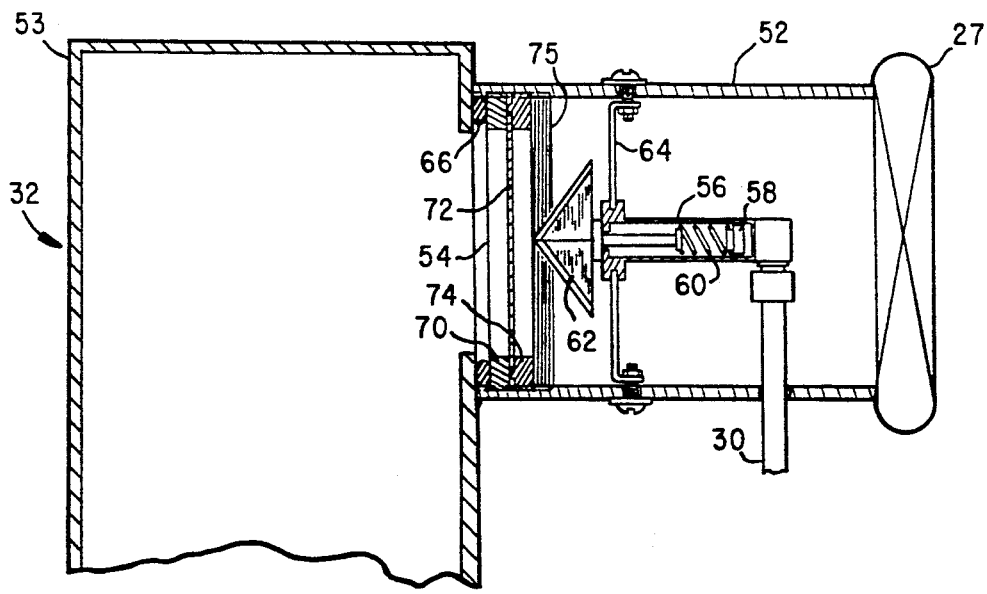
FIG. 4 is a side partial cross-sectional view of an unactuated mechanical cutter with a seal intact.
Figure 4A:
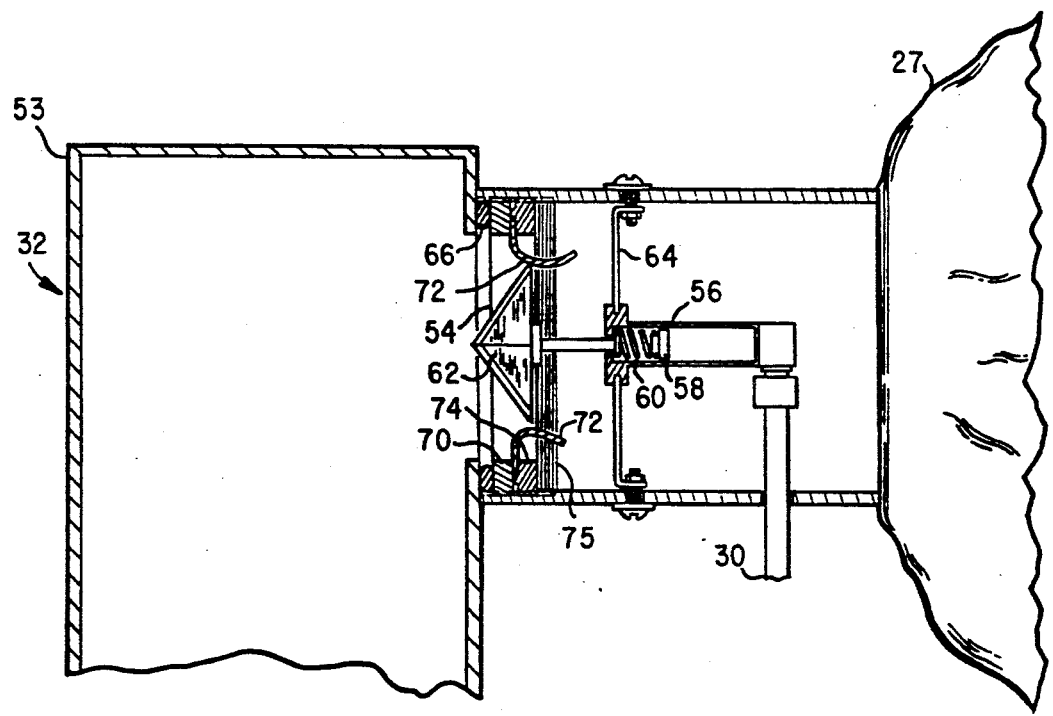
FIG. 4a is a side partial cross-sectional view of an actuated mechanical cutter piercing a seal.

Referring now to FIGS. 4 and 4a, air bag unit 32 is shown comprising an air canister 53 connected to air bag 27. Canister 53 is a source of pressurized fluid for air bag 27 and comprises a container containing fluid pre-pressurized above ambient pressure sufficient to inflate air bag 27. Also containing pre-pressurized fluid within canister 53 is seal 54. Seal 54 comprises a frangible seal fluidally separating canister 53 from air bag 27. Seal 54 is designed to be easily pierced, or otherwise cut while still being sufficiently strong to independently contain the pre-pressurized fluid.

Incorporated in a duct 52 between canister 53 and air bag 27 is a mechanical cutter 56. Mechanical cutter 56 is supported by duct 52 by mounting in a mounting bracket 64 which is fastened to duct 52. Cutter 56 actuates in response to sensor 24 and includes means for advancing a cutting tool 62. Cutter 56 receives fluid communication from sensor 24 through manifold 26 and transmitting line 30.

Cutter 56 comprises a piston 58 and spring 60, similar to sensor 24, as piston means for advancing cutting tool 62. The integrity of seal 54 defines a predetermined pressure at which cutting tool 62 will advance to positively pierce seal 54 and liberate fluid contained within canister 53 so as to inflate air bag 27. Like sensor 24, cutter 56 can also incorporate pressure regulating means or mechanical stop means to resist pressure until a predetermined pressure is exceeded, upon which cutting tool 62 advances to pierce seal 54. Cutter 56 only actuates at pressures above a predetermined pressure. Similar to sensor 24, in response to fluid communication through line 30, spring 60 can absorb energy caused by incidental contact and can also absorb that piston movement generated by the regulated pressure within cylinder 36. Referring to FIG. 4a, mechanical cutter 56 is shown with cutting tool 62 extended through seal 54 in an actuated position, thus piercing seal 54 and allowing fluid to flow through seal 54 into and inflating air bag 27.

Cutting tool 62 preferably has radially ribbed cutting blades with space between the blades, providing thorough cutting by the blades while allowing air flow across the spaces. Cutting tool 62 is also contemplated as comprising a chiseled end which pierces seal 54 or a hammer which strikes the seal, thus reducing the integrity of seal 54 and allowing pressure differential to blow out the seal. The invention also envisions other means to mechanically break, puncture, fracture or cut the seal.

Referring now to FIGS. 5, 6 and 7, seal 54 comprises a mounting ring 70 and a sealing ring 74 threaded within duct 52 against O-ring seal 66. Mounting ring 70 is of a malleable material such as brass, and has fastened to it by fasteners 78 a membrane 72 made from 0.003 inch thick brass shim stock. Membrane 72 can be other frangible or puncturable materials at different thicknesses as well, such as 0.001 inch thick steel and 0.125 inch thick glass. To provide additional sealing, sealing ring 74 is employed and has incorporated in one side a circumferential face seal comprising a ridge 80. Ridge 80 is at a radius which seals outside the radius of fasteners 78 against mounting ring 70. Because rings 70 and 74 are externally threaded within internal threads 75 of duct 52, alignment of ring 70 to ring 74 is desired. This alignment is provided by alignment slot 76 of ring 70 and alignment slot 82 of ring 74. When installed, seal 54 provides an effective seal which independently contains the pre-pressurized fluid within canister 53 while still being sufficiently frangible to allow piercing of membrane 72 upon receiving a piercing pressure in excess of a predetermined pressure. By independently containing the pre-pressurized fluid, seal 54 does not require additional means for support to prevent fluid within canister 53 from rupturing seal 54.

Pressurized fluid contained by canister 53 and seal 54 is prevented from circumventing membrane 72 by both O-ring seal 66 and ridge 80. Seal 66 and ridge 80 when installed in duct 52 provide effective full contact seals that also contain the pre-pressurized air within canister 53.

Other mechanical piercing means are also envisioned and which also advance in response to sensor 24. For example, referring to FIG. 8 an alternate embodiment is depicted having cutting tool 62 as a moving part of solenoid 83. Solenoid 83 contains solenoid coils 84, which when energized, produce an electromagnetic force which propels cutting tool 62 through membrane 72 of seal 54, thus liberating fluid from canister 53 to inflate air bag 27. Solenoid 83 actuates in response to receiving an electric signal through electric signal conductor 86. Because an electric signal is required to actuate solenoid 83, the alternate embodiment incorporates pressure transducer means for converting pressure communicated by sensor 24 to an electrical signal.

Figure 8A:
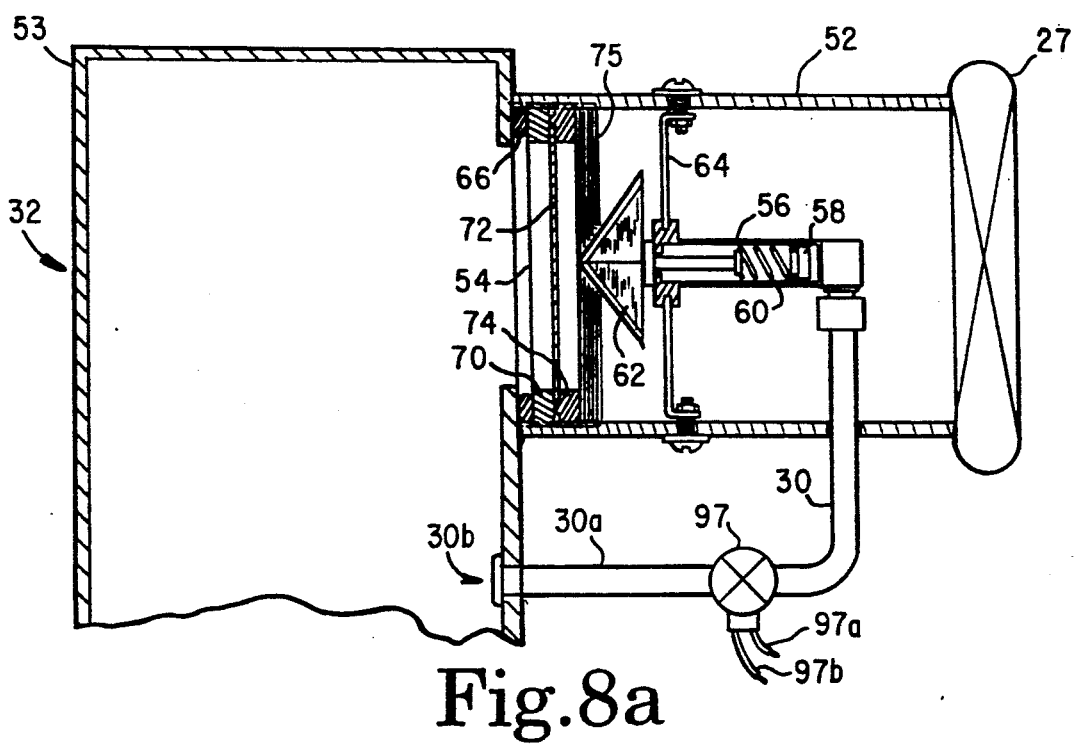
FIG. 8a is a side partial cross-sectional view of another alternate embodiment of the present invention with a mechanical cutter piston actuated by air through a sensor-activated valve.

Another alternative is shown in FIG. 8a. This system is the same as shown and described in FIG. 4 except that line 30 is coupled to canister 53 (via valve 97 and line 30a), instead of being coupled directly to the collision sensor (via the manifold chamber). In this embodiment, piston 58 is driven by air from canister 53 through opening 30b upon fast opening of valve 97. Valve 97 as shown is electrically opened by a signal through wires 97a and 97b. Accordingly, this system may be adapted to collision sensors providing an electric signal.

The connection between sensor 24 and mechanical cutter 56 can either be fluidic, electronic or otherwise, the essential function being that upon sensor 24 receiving substantial contact the system actuates a mechanical cutter to pierce seal 54. The cutter may reciprocate, as illustrated, or may strike, move in an arc, or even constitute a projectile cutter. Also, the cutter mechanism may be located within canister 53 and cut in an outward direction through membrane 72 in the same direction as air flow from the canister.

Figure 9:
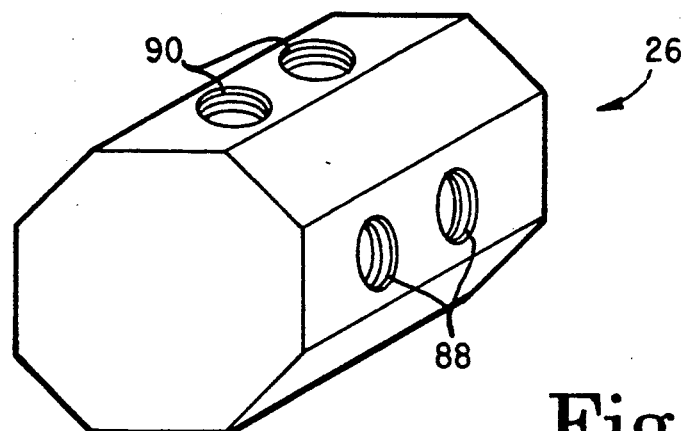
FIG. 9 is a front perspective view of a manifold.

Referring now to FIG. 9, manifold 26 is shown having receiving orifices 88 and transmitting orifices 90. Orifices 88 receive fluid communication from sensors 24, fluid communication including both flow and pressure characteristics of the fluid. In response to one or more sensors transmitting fluid communication indicative of a collision, manifold 26 transmits like fluid communication to one or more mechanical cutters 56. Similarly, in the alternte embodiment manifold 26 transmits fluid communication to pressure transducer means for converting fluid pressure to an electric signal, the signal then being transmitted to a solenoid which activates mechanical cutter 56.

The purpose of manifold 26 is essentially that of a relay in that a plurality of sensors can be connected to manifold 26, any one of the sensors providing fluid communication upon a collision. Upon receiving fluid communication from one or more actuating sensors, manifold 26 then transmits like fluid communication to one or more air bag units. Manifold 26 therefore separates air bag unit 32 from sensor 24 so that the number of sensors is independent of the number of air bag units.

Figure 10:
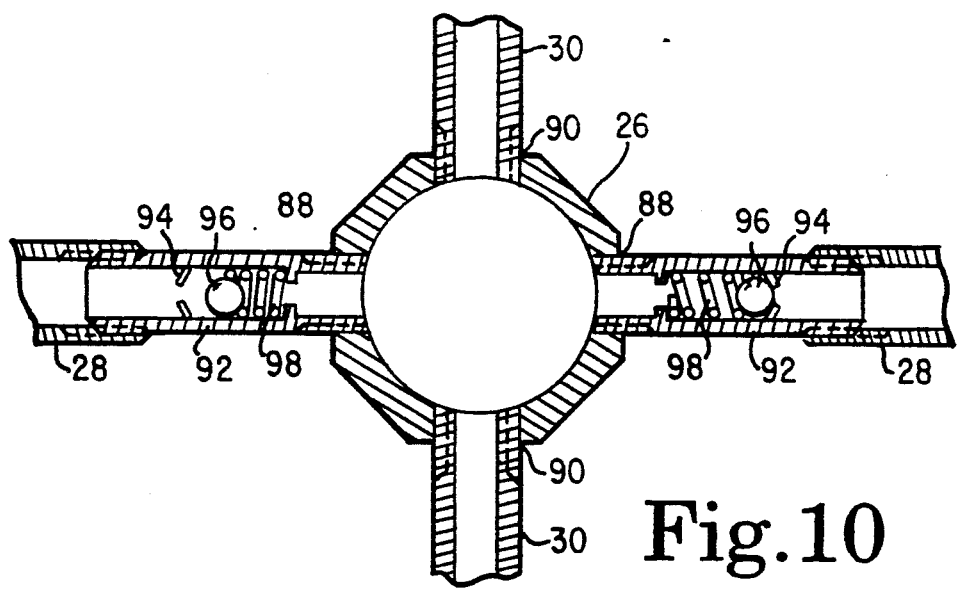
FIG. 10 is a front cross-sectional view of a manifold connected to receiving lines via check valves and connected to transmitting lines.

Referring now to FIG. 10, manifold 26 employs a plurality of one-way check valves 92 corresponding to the plurality of sensors. As shown in FIG. 10, each receiving line 28 has a check valve 92. Check valve 92 is similar to check valve 45 in that it also has a ball 96, a spring 98 and a seat 94. Upon manifold 26 receiving fluid communication from sensor 24 through receiving line 28, ball 96 unseats from seat 94 and allows pressurized fluid to enter manifold 26. The fluid must be at a sufficient pressure to overcome spring 98. Pressures below the predetermined spring pressure will not unseat ball 96 from seat 94 and therefore will not be relayed by manifold 26 to mechanical cutter 56. Once sufficient pressure is generated to unseat ball 96 and allow fluid to flow into manifold 26, the other check valves then prevent fluid within manifold 26 from communicating with other sensors through lines 28. Pressure within manifold 26 tends to drive ball 96 against seat 92 and prevent fluid communication with uncontacted sensors.

Pressurized fluid in manifold 26 then flows to all the air bag units of vehicle 22 fluidally connected to manifold 26. Additionally, more than one sensor can be activated at a time with the only difference being that multiple sources of fluid are received by manifold 26 as opposed to only one.

Also contemplated by this invention is a central location of the source of pressurized fluid, the fluid distributed by a similar manifold to a plurality of air bags. It is to be noted that the term "air bag" used herein not only includes atmospheric air, but also other fluid mediums so long as the fluid can be pressurized sufficiently to inflate an air bag. For example, $CO_2$ (carbon dioxide) can be employed as a fluid, thus providing an inflating medium as well as fire control upon the air bag deflating.

Air bag device 20 can be designed to function over a wide range of operating pressures. Lower pressure fluid sources can provide inflation of the air bags without posing significant sealing considerations. However, low fluid pressures also will increase air bag inflation times, or decrease the air bag inflation volume given a fixed inflation time. Similarly, air bag inflation times can be varied by adjusting both the pressure of the source fluid and/or the area of the duct feeding the air bag. Pressurized sources of fluid can range beyond hundreds of PSI; however, device 20 employs a pre-pressurized fluid stored in container 53 at 100—250 PSI. Depending upon the pressure of the source fluid and the area of the duct feeding the air bag, device 20 can be adjusted to include a wide range of inflation times in the range of milliseconds by employing fluid pressurized beyond 250 PSI. The invention contemplates pressures beyond 250 PSI in varying configurations of the device 20 as required by the particular application of the invention.

It is desirable to have the overall air bag and sensor system independent from the other systems of the vehicle. This allows operation of the present invention regardless of the operability of other vehicle systems during a collision.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A safety device for use with a vehicle, comprising:
   at least one sensing means for sensing a collision;
   one or more inflatable means for protecting against impact from a collision involving said vehicle, said inflatable means inflating in response to said sensing means sensing said collision;
   a common manifold;
   wherein said manifold is fluidally coupled to one or more of said sensing means through a corresponding number of one-way check valves, said check valves allowing only fluid communication from said sensing means to said manifold, and wherein said manifold is also fluidally coupled to at least one of said inflatable means; and
   whereupon one or more sensing means sensing a collision, said manifold receives fluid communication from said sensing means through said one-way check valves, and said manifold transmits fluid communication to one or more inflatable means, thereby causing said inflatable means to inflate.

2. A safety device for a vehicle, comprising:
   (a) a plurality of sensing means for sensing a collision,
   (b) an inflatable air bag,
   (c) a source of pressurized fluid coupled to said air bag,
   (d) a seal fluidally separating said source from said air bag,
   (e) mechanical cutting means, including a first piston and a cutting tool, for mechanically cutting said seal, said cutting tool advanceable by said first piston in response to fluid pressure applied thereto,
   (f) wherein said seal interrupts fluid flow from said source to said air bag prior to a collision, and upon collision said sensing means causes fluid pressure to be communicated to said first piston to advance said cutting tool, thereby causing the cutting tool to positively cut said seal and allowing fluid to flow from said source to said air bag and inflate said air bag,
   (g) said source of pressurized fluid comprising a storage container, said storage container and said seal containing fluid pre-pressurized above ambient pressure sufficient to inflate said air bag,
   (h) each of said plurality of sensing means comprising:
      (i) a fluid cylinder having an actuating orifice, said orifice communicating with said mechanical cutting means so that pressure within said cylinder in excess of a predetermined pressure causes actuation of said mechanical cutting means,
      (ii) a second piston movable within said cylinder,
      (iii) a spring connected to said second cylinder,
      (iv) wherein said sensing means is attached to said vehicle so that contact made with said vehicle causes relative movement between said second piston and said cylinder,
      (v) wherein said relative movement encompasses a range of second piston positions within said cylinder including an initial position, a damping position and an actuating position,
      (vi) said initial position normally occurring when no contact is made with said vehicle,
      (vii) said damping position occurring when incidental contact is made with said vehicle, said spring absorbing energy from said incidental contact to prevent pressurizing said fluid cylinder above said predetermined pressure,
      (viii) said actuating position occurring when substantial contact, such as a collision, is made with said vehicle, said contact pressurizing said fluid cylinder above said predetermined pressure,
   (i) each of said plurality of fluid cylinders further comprising a one-way check valve, and means for setting said predetermined pressure including a precharge orifice which communicates fluid pressure from a regulated pressure source to said fluid cylinder through its respective one-way check valve, said check valve preventing pressurized fluid from escaping said fluid cylinder through said precharge orifice,
   (j) each of said springs being contained within its respective fluid cylinder,
   (k) each of said plurality of fluid cylinders further comprising a bleed orifice located between said second piston and said actuating orifice so that when said incidental contact occurs, fluid communicates across said bleed orifice,
   (l) said cutting tool is advanceable in response to pressure in any of said fluid cylinders exceeding said predetermined pressure toward and at least partially through said seal to rupture said seal to inflate said air bag,
   (m) a common manifold fluidally coupled to said plurality of fluid cylinders through said plurality of one-way check valves, said check valves allowing only fluid communication from said cylinders to said manifold,
   (n) said manifold also being fluidally coupled to said first piston,
   (o) whereupon at least one sensing means sensing a collision, said manifold receives fluid communication from a fluid cylinder through a corresponding one-way check valve and said manifold transmits fluid communication to said first piston, thereby allowing said cutting tool to rupture said seal and liberate said fluid from said source to inflate said air bag.

3. A safety device for a vehicle, comprising:
   (a) a plurality of sensing means for sensing a collision,
   (b) an inflatable air bag,
   (c) a source of pressurized fluid coupled to said air bag,
   (d) a seal fluidally separating said source from said air bag,
   (e) mechanical cutting means including a first piston and a cutting tool, for mechanically cutting said seal, said cutting tool advanceable by said first piston in response to fluid pressure applied thereto,
   (f) wherein said seal interrupts fluid flow from said source to said air bag prior to a collision, and upon collision said sensing means causes fluid pressure to be communicated to said first piston to advance said cutting tool, thereby causing the cutting tool to positively cut said seal and allowing fluid to flow from said source to said air bag and inflate said air bag,
   (g) each of said plurality of sensing means comprising:
      (i) a fluid cylinder having an actuating orifice, said orifice communicating with said mechanical cutting means so that pressure within said cylinder in excess of a predetermined pressure causes actuation of said mechanical cutting means, (ii) a second piston movable within said cylinder,
(iii) a spring contained in said second cylinder,
(iv) wherein said sensing means is attached to said vehicle so that contact made with said vehicle causes relative movement between said second piston and said cylinder,
(v) wherein said relative movement encompasses a range of second piston positions within said cylinder including an initial position, a damping position and an actuating position,
(vi) said initial position normally occurring when no contact is made with said vehicle,
(vii) said damping position occurring when incidental contact is made with said vehicle, said spring absorbing energy from said incidental contact to prevent pressurizing said cylinder above said predetermined pressure,
(viii) said actuating position occurring when substantial contact, such as a collision, is made with said vehicle, said contact pressurizing said fluid cylinder above said predetermined pressure,
(h) a plurality of one-way check valves, each check valve being associated with a sensing means,
(i) a common manifold fluidally coupled to said plurality of sensing means through said plurality of check valves,
(j) said check valves allowing only fluid communication from said sensing means to said manifold,
(k) said manifold also being fluidally coupled to said mechanical cutting means,
(l) whereupon at least one sensing means sensing a collision, said manifold receives fluid communication from said sensing means through a corresponding one-way check valve, and said manifold transmits fluid communication to said first piston thereby causing said cutting tool to cut said seal and liberate fluid to flow from said source to inflate said air bag.

4. A safety device for use with a vehicle, comprising:
(a) inflation means for protecting an occupant of the vehicle from a collision involving said vehicle, said inflation means including:
(i) a first piston,
(ii) a cutting tool,
(iii) a seal separating a source of pressurized fluid from an air bag,
(b) a sensor which senses collisions, comprising:
(i) a fluid cylinder having an actuating orifice,
(ii) a second piston movable within said fluid cylinder,
(iii) a spring contained with said cylinder and connected to said second piston,
(c) said sensor being attached to said vehicle so that contact made with said vehicle causes relative movement between said second piston and said cylinder,
(d) wherein said relative movement encompasses a range of second piston positions within said cylinder including an initial position, a damping position, and an actuating position,
(i) said initial position normally occurring when no contact is made with said vehicle,
(ii) said damping position occurring when incidental contact is made with said vehicle, said spring absorbing energy from said incidental contact to prevent pressurizing said cylinder above a predetermined pressure at which said first piston would be advanced to break said seal and cause said air bag to inflate,
(iii) said actuating position occurring when substantial contact, such as a collision, is made with said vehicle, said contact pressurizing said cylinder above said predetermined pressure causing said first piston to be advanced to break said seal and cause said air bag to inflate,
(e) said fluid cylinder comprising a bleed orifice so that when said incidental contact occurs, fluid communicates across said bleed orifice.

5. Apparatus as in claim 4, further comprising:
(f) a first seal in said fluid cylinder,
(g) a second seal in said fluid cylinder,
(h) said spring being interposed between said first and second seals and urging said first and second seals apart,
(i) said first and second seals being movable with respect to each other within said fluid cylinder,
(j) said fluid cylinder and said first and second seals collectively defining a venting chamber vented by said bleed orifice.

6. A safety device for a vehicle, comprising:
(a) an inflatable air bag,
(b) a source of pressurized fluid coupled to said air bag,
(c) a seal fluidally separating said source from said air bag,
(d) mechanical cutting means for mechanically cutting said seal,
(e) a plurality of fluid cylinders each having an actuating orifice and a bleed orifice, said actuating orifice communicating with said mechanical cutting means so that pressure within said fluid cylinder in excess of a predetermined pressure causes actuation of said mechanical cutting means,
(f) a plurality of first pistons, each movable within a fluid cylinder,
(g) a plurality of springs, each said spring being contained within a fluid cylinder and located between the said first piston and actuating orifice in said fluid cylinder,
(h) each said first piston and each said fluid cylinder being associated with said vehicle so that contact made with said vehicle causes relative movement between each first piston and its respective fluid cylinder,
(i) said relative movement encompassing a range of first piston position within said cylinder including an intial position, a damping positing and an actuating position,
(i) said initial position normally occurring when no contact is made with said vehicle,
(ii) said damping position occurring when incidental contact is made with said vehicle, said spring absorbing energy from said incidental contact and said bleed orifice communicating fluid therein across to prevent pressurizing said fluid cylinder above said predetermined pressure,
(iii) said actuating position occurring when substantial contact, such as a collision, is made with said vehicle, said contact pressurizing said fluid cylinder above said predetermined pressure,
(j) wherein said seal interrupts fluid flow from said source of pressurized fluid to said air bag prior to a collision, and upon collision a fluid cylinder communicates pressurized fluid to said mechanical cutting means to positively cut said seal, thereby allowing fluid to flow from said source of pressurized fluid to said air bag and inflate said air bag, (k) each said fluid cylinder further comprising:
 (i) a first one-way check valve,
 (ii) means for setting said predetermined pressure including a precharge orifice which communicates fluid pressure from a regulated pressure source to said cylinder through said first one-way check valve,
 (iii) said first one-way check valve preventing pressurized fluid from escaping said cylinder through said precharge orifice, (l) said mechanical cutting means comprising:
 (i) a mechanical cutter having a cutting tool advanceable in response to pressure in a fluid cylinder exceeding said predetermined pressure toward and at least partially through said seal to rupture said seal thereby liberating pressurized fluid from said source of pressurized fluid to inflate said air bag,
 (ii) said cutter including second piston means for advancing said cutting tool,
 (iii) wherein pressure within said fluid cylinder is fluidally communicated to said second piston means to apply a force thereto and actuate said cutter, (m) a plurality of second one-way check valves, each associated with a fluid cylinder, (n) a common manifold fluidally coupled to said plurality of fluid cylinders through said second one-way check valves and also fluidally coupled to said cutter, (o) said second check valves allowing only fluid communication from said fluid cylinders to said manifold, (p) whereupon substantial contact pressurizing at least one fluid cylinder above said predetermined pressure, said manifold receives fluid communication from said pressurized fluid cylinder through a corresponding second one-way check valve, and said manifold transmits fluid communication to said cutter, thereby causing said cutter to cut said seal and liberate fluid to flow from said source of pressurized fluid to inflate said air bag.

* * * * *